United States Patent
Naitoh et al.

(10) Patent No.: US 9,936,167 B2
(45) Date of Patent: Apr. 3, 2018

(54) IMAGING DEVICE, IMAGING METHOD, IMAGE PROCESSING DEVICE, AND RECORDING MEDIUM STORING IMAGING PROGRAM

(71) Applicants: Takuroh Naitoh, Kanagawa (JP); Akira Kataoka, Kanagawa (JP); Hiromitsu Shimizu, Kanagawa (JP); Masato Ishii, Kanagawa (JP)

(72) Inventors: Takuroh Naitoh, Kanagawa (JP); Akira Kataoka, Kanagawa (JP); Hiromitsu Shimizu, Kanagawa (JP); Masato Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 454 days.

(21) Appl. No.: 14/589,269

(22) Filed: Jan. 5, 2015

(65) Prior Publication Data
US 2015/0201168 A1 Jul. 16, 2015

(30) Foreign Application Priority Data

Jan. 14, 2014 (JP) .................................. 2014-004294

(51) Int. Cl.
*H04N 9/47* (2006.01)
*H04N 7/18* (2006.01)
(Continued)

(52) U.S. Cl.
CPC ............... *H04N 7/183* (2013.01); *B60R 1/00* (2013.01); *H04N 5/2351* (2013.01);
(Continued)

(58) Field of Classification Search
CPC ...... H04N 7/183; H04N 5/2351; H04N 5/243; H04N 9/69; B06R 1/00; B06R 2300/101
See application file for complete search history.

(56) References Cited

U.S. PATENT DOCUMENTS 8,836,850 B2 * 9/2014 Kaida .................. H04N 5/2351
348/221.1
9,253,374 B2 * 2/2016 Kobayashi ............. H04N 5/202
(Continued)

FOREIGN PATENT DOCUMENTS

CN 1662072 A 8/2005
CN 102572272 A 7/2012
(Continued)

OTHER PUBLICATIONS

Extended European Search Report dated May 20, 2015 in Patent Application No. 14200530.5.
(Continued)

*Primary Examiner* — Nhon Diep
(74) *Attorney, Agent, or Firm* — Oblon, McClelland, Maier & Neustadt, L.L.P.

(57) ABSTRACT

An imaging device, an imaging method, and a recording medium storing an imaging program are provided. Each of the imaging device, imaging device, and the recording medium storing the imaging program outputs image data of an object on an image output unit, stores multiple levels of luminosity of the object in a memory in association with a plurality of set values that are referred to when image processing is performed on image data, specifies the level of luminosity of the object, selects one of the set values stored in the memory based on the level of luminosity specified by the specifying, and performs image processing on the image data output from the image output unit, based on the set value selected by the selecting.

16 Claims, 7 Drawing Sheets

(51) Int. Cl.
    *H04N 5/235*     (2006.01)
    *H04N 5/243*     (2006.01)
    *B60R 1/00*     (2006.01)
    *H04N 9/69*     (2006.01)

(52) U.S. Cl.
    CPC ........ *H04N 5/243* (2013.01); *B60R 2300/101* (2013.01); *H04N 9/69* (2013.01)

(56) References Cited

U.S. PATENT DOCUMENTS

| | | |
|---|---|---|
| 2005/0190272 A1 | 9/2005 | Takahashi et al. |
| 2005/0200915 A1 | 9/2005 | Michiie et al. |
| 2005/0231764 A1 | 10/2005 | Michiie et al. |
| 2006/0059281 A1 | 3/2006 | Michiie et al. |
| 2007/0024923 A1 | 2/2007 | Shimizu |
| 2007/0053009 A1 | 3/2007 | Ito et al. |
| 2007/0070405 A1 | 3/2007 | Murakata et al. |
| 2010/0079622 A1 | 4/2010 | Kasahara et al. |
| 2010/0302410 A1 | 12/2010 | Naito |

FOREIGN PATENT DOCUMENTS

| | | |
|---|---|---|
| CN | 102630021 A | 8/2012 |
| JP | 2010-081511 | 4/2010 |
| JP | 2012-119997 | 6/2012 |
| WO | WO 2009/107705 A1 | 9/2009 |
| WO | WO 2012/155951 A1 | 11/2012 |

OTHER PUBLICATIONS

Combined Office Action and Search Report dated Jun. 1, 2017, in Chinese Patent Application No. 201510015545.4.
Japanese Office Action dated Nov. 21, 2017 in Japanese Application No. 2014-004294, 2 pages.

* cited by examiner

| FUNCTION | REGISTER | SET VALUE IN REGISTER TABLE | | | | | |
|---|---|---|---|---|---|---|---|
| | | R0 | R1 | R2 | R3 | R4 | R5 |
| PHOTO-METRIC AREA | 0x000A | F5 | F4 | F3 | F2 | F1 | F0 |
| | 0x000B | 5F | 4F | 3F | 2F | 1F | 0F |
| | 0x000C | FA | F8 | F6 | F4 | F2 | F0 |
| | 0x000D | AF | 8F | 6F | 4F | 2F | 0F |
| COLOR MATRIX | 0x0015 | 47 | 47 | 47 | 46 | 46 | 46 |
| | 0x0018 | 5E | 5D | 5D | 5C | 5C | 5B |
| GAMMA | 0x1001 | 1F | 1E | 1D | 1B | 1A | 19 |
| | 0x1002 | 2C | 2C | 2C | 2C | 2C | 2C |
| | 0x1003 | 46 | 46 | 46 | 46 | 46 | 46 |
| | 0x1004 | 5A | 5A | 5A | 5A | 5A | 5A |
| | 0x1005 | 64 | 64 | 63 | 63 | 62 | 62 |
| | 0x1006 | 6E | 6D | 6C | 6A | 69 | 68 |
| | 0x1007 | 77 | 75 | 73 | 72 | 70 | 6E |
| | 0x1008 | 7F | 7D | 7B | 78 | 76 | 74 |
| | 0x1009 | 86 | 84 | 81 | 7F | 7C | 7A |
| | 0x100a | 92 | 90 | 8D | 8B | 88 | 86 |
| | 0x100b | 9D | 9A | 98 | 95 | 93 | 90 |
| | 0x100c | A8 | A5 | A3 | A0 | 9E | 9B |
| | 0x100d | BF | BC | B9 | B6 | B3 | B0 |
| | 0x100e | D3 | D0 | CE | CB | C9 | C6 |
| | 0x100f | E6 | E4 | E1 | DF | DC | DA |
| | 0x1010 | 11 | 12 | 14 | 16 | 18 | 19 |

71

72

73 — 731

74 — 741

75

76

IMAGING DEVICE, IMAGING METHOD, IMAGE PROCESSING DEVICE, AND RECORDING MEDIUM STORING IMAGING PROGRAM

CROSS-REFERENCE TO RELATED APPLICATION

This patent application is based on and claims priority pursuant to 35 U.S.C. § 119(a) to Japanese Patent Application No. 2014-004294, filed on Jan. 14, 2014, in the Japan Patent Office, the entire disclosure of which is hereby incorporated by reference herein.

BACKGROUND

Technical Field

Example embodiments of the present invention generally relate to an imaging device, imaging method, image processing device, and a recording medium storing an imaging program.

Background Art

It is desired for a vehicle-installed imaging device to output an image where an object is appropriately recognizable regardless of the capturing condition such as the white balance and the exposure at the time of capturing the image (such an optimal image may be referred to as an "appropriate image" in the description below). For this reason, imaging devices in which the capturing conditions are automatically set are known in the art.

It is known for vehicle-installed imaging devices that the conditions for an object change widely due to various factors such as changes in weather, reflection light from sign boards around street, changes in illumination/lighting, changes in brightness inside and outside a tunnel, and sunlight filtering down through the trees. For this reason, it is desired for the capturing conditions of a vehicle-installed imaging device to be changed frequently in a wide range.

SUMMARY

Embodiments of the present invention described herein provide an imaging device, an imaging method, and a recording medium storing an imaging program. Each of the imaging device, imaging device, and the recording medium storing the imaging program outputs image data of an object on an image output unit, stores multiple levels of luminosity of the object in a memory in association with a plurality of set values that are referred to when image processing is performed on image data, specifies the level of luminosity of the object, selects one of the set values stored in the memory based on the level of luminosity specified by the specifying, and performs image processing on the image data output from the image output unit, based on the set value selected by the selecting. The set values are stored in the memory in association with the corresponding multiple levels of luminosity, and the selecting selects one of the set values based on the set value being referred to by the performing image processing and the set value stored in the memory in association with the level of luminosity specified by the specifying.

BRIEF DESCRIPTION OF THE SEVERAL VIEWS OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
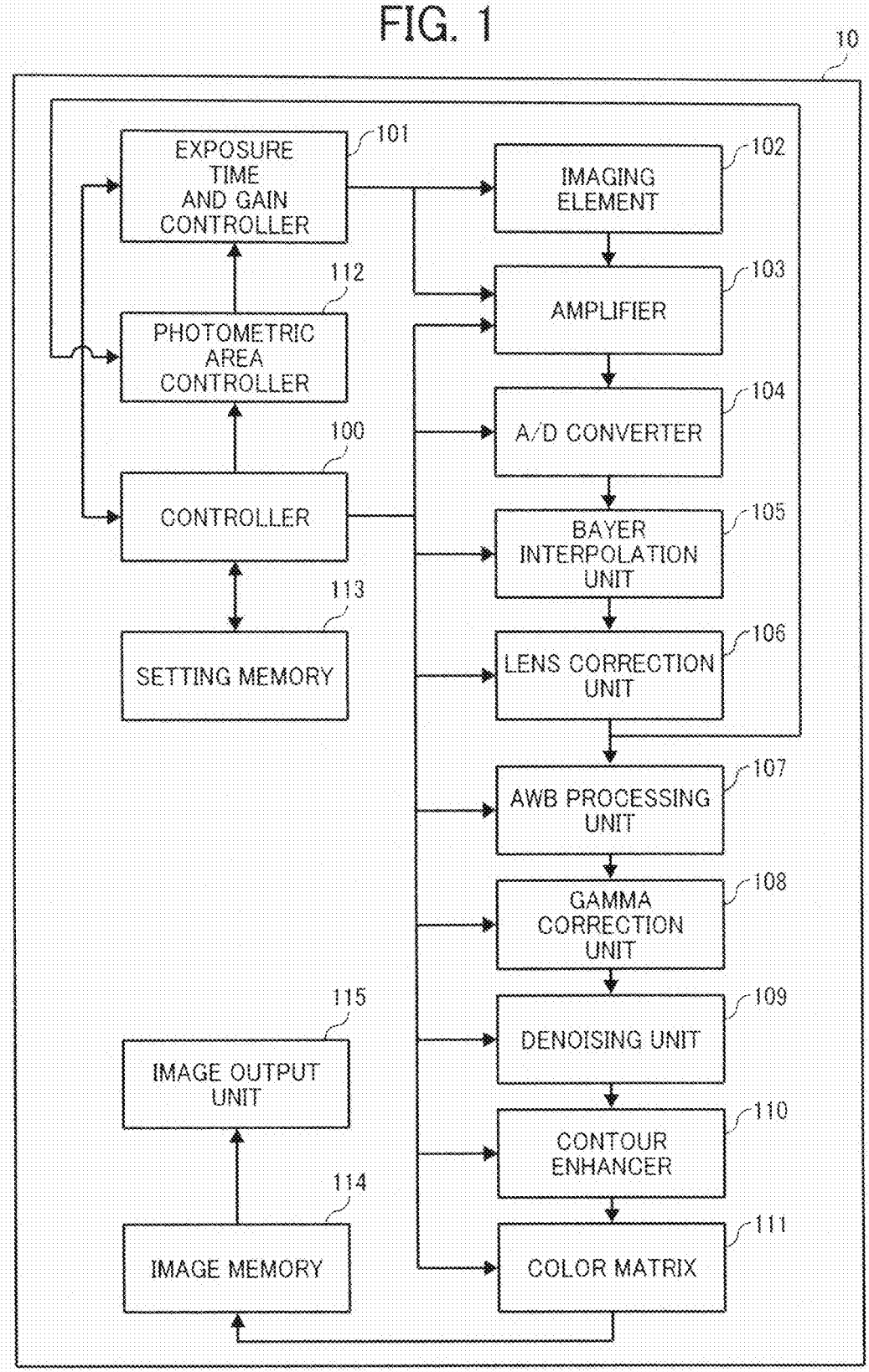
FIG. 1 is a block diagram of an imaging device according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An imaging device, imaging method, image processing device, and an imaging program according to an example embodiment of the present invention are described below with reference to the drawings.

<Imaging Device>

Firstly, an imaging device according to an example embodiment of the present invention is described. The imaging device according to the present example embodiment is applied, for example, to a camera for object detection or a camera for a drive recorder that captures images in the direction of travel of a vehicle.

However, it is to be noted that the use of the imaging device according to the present example embodiment is not limited to these example applications. For example, the imaging device according to the present example embodiment may be applied to surveillance cameras that are installed in supermarkets or convenience stores. Moreover, the imaging device according to the present example embodiment may be applied to safety devices of railways or shipping, or imaging devices in the factory automation (FA) fields.

FIG. 1 is a block diagram of an imaging device according to the present example embodiment. As illustrated in FIG. 1, an imaging device 10 includes a controller 100, an exposure time and gain controller 101, an imaging element 102, an amplifier 103, an analog-to-digital (A/D) converter 104, a Bayer interpolation unit 105, and a lens correction unit 106. Moreover, the imaging device 10 includes an auto white balance (AWB) processing unit 107, a gamma correction unit 108, a denoising unit 109, a contour enhancer 110, a color matrix 111, a photometric area controller 112, and a setting memory 113.

Further, the imaging device 10 includes an image memory 114 and an image output unit 115.

The controller 100 includes an information processing circuitry (computer) such as a CPU. The CPU of the controller 100 performs operation of imaging according to an example embodiment of the present invention, as will be described later, by executing an imaging program stored in the setting memory 113.

More specifically, the controller 100 realizes the functions of a luminosity specifying unit, a set value selector, an image processing unit, and a set value update unit of the imaging device of the imaging device according to the present example embodiment.

Moreover, the controller 100 transmits signals of set value such as clock signals, horizontal/vertical synchronizing signals, signals of register set value to the elements of the imaging device 10, to control the operation of each element in a pipeline-like (direct) manner.

The exposure time and gain controller 101 compares the level of luminosity (i.e., the obtained luminosity value) received from the photometric area controller 112 with a target level of luminosity received from the controller 100.

When the obtained luminosity value is equal to or less than a target level of luminosity as a result of the comparison, the exposure time and gain controller 101 extends the exposure time of the imaging element 102, or increases the gain of the amplifier 103. When the obtained luminosity value is equal to or greater than a target level of luminosity as a result of the comparison, the exposure time and gain controller 101 shortens the exposure time of the imaging element 102, or reduces the gain of the amplifier 103.

In other words, the exposure time and gain controller 101 transmits a control signal of exposure time to the imaging element 102 and transmits a control signal of gain to the amplifier 103, based on the results of comparison between the obtained luminosity value and a target level of luminosity.

In known methods, the exposure time and gain controller 101 controls the brightness of an image by varying the exposure time as long as the exposure time is controllable, and controls the exposure time by controlling the gain of the amplifier 103. In other words, when the exposure time reaches a controllable upper limit, the exposure time and gain controller 101 controls the gain of the amplifier 103 to control the brightness of an image.

The exposure time and gain controller 101 controls the exposure time and gain at all times while the imaging device 10 is operating, such that the image data obtained by the imaging device 10 is always with appropriate brightness (i.e., target level of luminosity).

The exposure time and gain controller 101 may obtain data indicating brightness such as a brightness value, exposure time, and a f number from the imaging element 102 or the like instead of a luminosity value, and compare the obtained value with a target value.

The imaging element 102 converts the optical image captured by using an optical system into an electrical signal (image data). The imaging element 102 is, for example, a charge-coupled device (CCD) image sensor or a complementary metal oxide semiconductor (CMOS) image sensor.

The imaging element 102 includes a color filter of Bayer patterns. The imaging element 102 sequentially outputs RGB (red, green, blue) image data of Bayer patterns based on the coordinate values (x, y) output from the controller 100.

Note that the controller 100 also transmits the coordinate values (x, y) that have been sent to the imaging element 102 to other elements sequentially at the subsequent stages with prescribed length of time lag. The coordinate values (x, y) may be generated by, for example, a controller inside the imaging element 102.

The amplifier 103 amplifies the analog signals of image data received from the imaging element 102 with the gain output from the exposure time and gain controller 101, and transmits the amplified analog signals of image data to the A/D converter 104.

The A/D converter 104 converts the analog signals of RGB image data of Bayer patterns received from the imaging element 102 into digital signals, and transmits the obtained digital signals to the Bayer interpolation unit 105. Each of the digital signals output from the A/D converter 104 is made of, for example, 8 bits for each RGB.

The Bayer interpolation unit 105 linearly interpolates the digitalized RGB image data of the Bayer patterns, at all the coordinates for the respective colors of RGB. The Bayer interpolation unit 105 transmits the interpolated RGB image data to the lens correction unit 106.

The lens correction unit 106 corrects the lens characteristics of the interpolated RGB image data by performing peripheral light quantity correction, lateral chromatic aberration correction, or distortion correction. The lens correction unit 106 transmits the corrected RGB image data to the AWB processing unit 107 and the photometric area controller 112. The AWB processing unit 107 calculates the appropriate gain of AWB from the RGB image data, to amplify the values of R and B of the RGB image data. The AWB processing unit 107 transmits the processed RGB image data to the gamma correction unit 108.

The gamma correction unit 108 performs prescribed gamma correction processes on each value of the RGB of the RGB image data with reference to a look-up table or the like. The gamma correction unit 108 transmits the RGB image data for which the gamma correction processes have been performed to the denoising unit 109.

The denoising unit 109 performs smoothing processes on the RGB image data using a low pass filter or the like, and transmits the obtained RGB image data to the contour enhancer 110.

The contour enhancer 110 performs contour enhancing processes on the RGB image data, and transmits the obtained RGB image data to the color matrix 111.

Note that the denoising unit 109 and the contour enhancer 110 obtain the gain value that is output from the exposure time and gain controller 101 to the amplifier 103, and change the processing levels of the denoising unit 109 and the contour enhancer 110 according to the obtained gain value.

The color matrix 111 converts the RGB image data into YcbCr image data using the following equations (1), (2), and (3).

$$Y=0.299R+0.587G+0.114B \quad (1)$$

$$Cr=0.500R-0.419G-0.081B \quad (2)$$

$$Cb=-0.169R-0.332G+0.500B \quad (3)$$

The photometric area controller 112 extracts luminosity data from the RGB image data that has been obtained from the lens correction unit 106. Here, the photometric area controller 112 obtains a luminosity value only from a prescribed area of the image, for example, from the area of image specified by the controller 100.

After the luminosity value of the image is obtained, the photometric area controller 112 transmits the luminosity value to the controller 100 and the exposure time and gain controller 101.

The setting memory 113 stores an imaging program according to the present example embodiment or a register table according to the present example embodiment in which set values are associated with the corresponding multiple levels of luminosity. Note that the set value is a value that is referred to when image processing is performed on image data. The setting memory 113 is made of, for example, a read only memory (ROM).

The imaging program according to the present example embodiment may be installed in the setting memory 113 through a memory card or the network.

The image memory 114 stores the YcbCr image data output from the color matrix 111. The image memory 114 is made of, for example, a synchronous dynamic random access memory (SDRAM).

The image output unit 115 is, for example, a liquid crystal display (LCD) that displays YcbCr image data.

<Imaging Method>

Next, an imaging method according to an example embodiment of the present invention performed by the controller 100 of the imaging device 10 is described.

Figure 2:
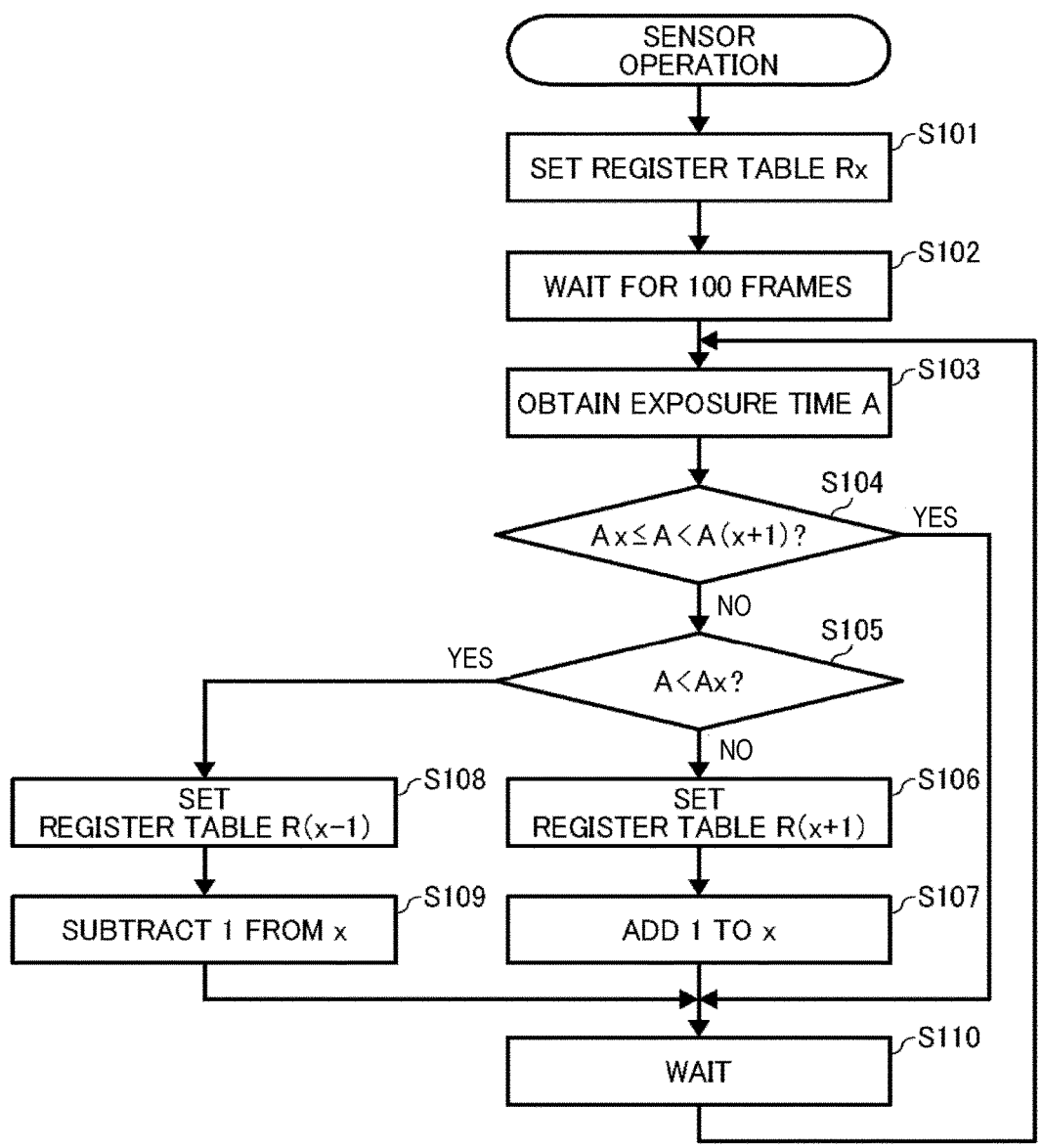
FIG. 2 is a flowchart of an imaging method with the imaging device of FIG. 1, according to an example embodiment of the present invention.

FIG. 2 is a flowchart of an imaging method performed by the imaging device 10, according to the present example embodiment. As depicted in FIG. 2, after the sensor of the imaging element 102 starts operating, the controller 100 of the imaging device 10 selects a prescribed register table Rx from a plurality of register tables stored in the setting memory 113, and sets the selected register table Rx as a selected set value (S101).

Figures 3, 4:
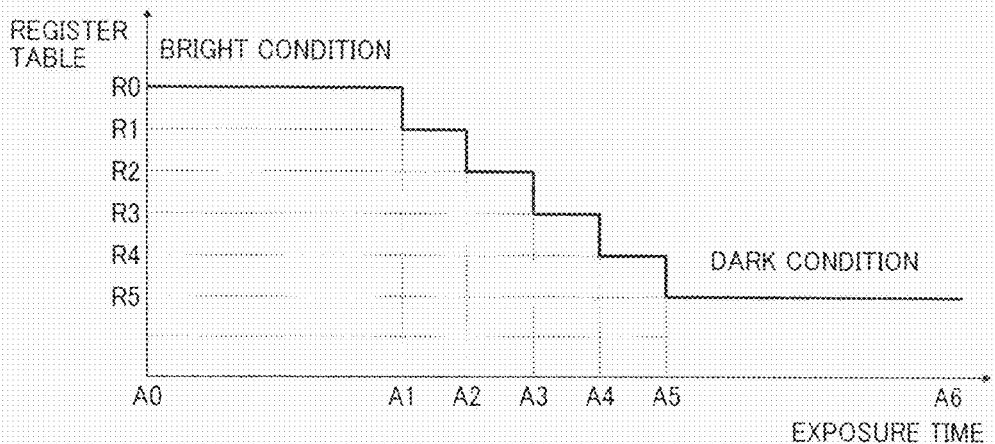
FIG. 3 is a schematic diagram of the relationship between exposure time and register tables of the imaging device of FIG. 1, according to an example embodiment of the present invention.
FIG. 4 is a diagram of the register tables used by the imaging device of FIG. 1 and the corresponding set values, according to an example embodiment of the present invention.

FIG. 3 is a schematic diagram of the relationship between exposure time and register tables of the imaging device 10, according to the present example embodiment. In FIG. 3, the vertical axis indicates the type of register table. Note that the register tables are sets (R0 to R5) of a plurality of settings of image processing for the imaging device 10, which are examples of set value according to the present example embodiment.

The register table R0 is an optimal setting of image processing under bright capturing conditions. By contrast, the register table R5 is an optimal setting of image processing under bark conditions. The register tables R1, R2, R3, and R4 as linearly-interpolated settings of image processing are obtained by dividing the area between the register table R0 and the register table R5 into five equal areas.

In FIG. 3, the horizontal axis indicates thresholds for exposure time. The exposure time is an example of the level of luminosity that is the data indicating the brightness at the time of capturing an image. Instead of the exposure time, data such as a brightness value, sensitivity, an f number, and the combinations of these elements may be obtained as a luminosity value.

It is assumed that the shortest exposure time for the imaging device 10 is A0. When the exposure time is at somewhere between A0 and A1, the capturing condition is considered to be a bright condition, and the register table R0 is used.

It is assumed that the longest exposure time for the imaging device 10 is A6. When the exposure time is at somewhere between A5 and A6, the capturing condition is considered to be a dark condition, and the register table R5 is used.

The exposure time A2, A3, and A4 as thresholds for the linearly-interpolated exposure time are obtained by dividing the area between the exposure time A1 and the exposure time A5 into four equal areas.

Note that the number of the register tables and the number of the thresholds for exposure time are not limited to the numbers in the above examples but may be any number.

In the present example embodiment, the six kinds of register tables R0, R1, R2, R3, R4, and R5 are stored in the setting memory 113. The controller 100 selects one of the register tables R0, R1, R2, R3, R4, and R5 according to the following conditions.

When the threshold for the exposure time is equal to or greater than A0 and less than A1, the controller 100 selects the register table R0. When the threshold for the exposure time is equal to or greater than A1 and less than A2, the controller 100 selects the register table R1. When the threshold for the exposure time is equal to or greater than A2 and less than A3, the controller 100 selects the register table R2.

When the threshold for the exposure time is equal to or greater than A3 and less than A4, the controller 100 selects the register table R3. When the threshold for the exposure time is equal to or greater than A4 and less than A5, the controller 100 selects the register table R4. When the threshold for the exposure time is equal to or greater than A5 and equal to or less than A6, the controller 100 selects the register table R5.

FIG. 4 is a diagram of the register tables R0 to R5 used by the imaging device 10 and the corresponding set values, according to the present example embodiment. As illustrated in FIG. 4, [the set values of, for example,] setting items for image processing such as photometric areas, color matrixes, gamma values are stored in the columns of the register tables R0 to R5 such that the set values of these setting items are varied depending on the length of exposure time (level of luminosity).

The controller 100 transmits the set values of the selected one of the register tables R0 to R5 to a relevant element. For example, the set values of photometric area, the set values of color matrix, and the set values of gamma value are transmitted to the photometric area controller 112, the color matrix 111, and the gamma correction unit 108, respectively.

In the imaging device 10, the number or type of the setting items is not limited to the number or type in the above example. For example, in the imaging device 10, the controller 100 may control the exposure time of the imaging element 102 or the gain of the amplifier 103 using the register tables, in place of the exposure time and gain controller 101.

In the imaging device 10, the controller 100 may obtain luminosity data in place of the photometric area controller 112.

Referring back to FIG. 2, the controller 100 waits (WAIT) until the initial state of the imaging device 10 becomes stable. More specifically, the controller 100 waits and does not start the subsequent processes until the time for a prescribed number of frames (e.g., a hundred frames) passes after the register table Rx is set (S102).

After the controller 100 waits until the time for a prescribed number of frames passes, the controller 100 obtains exposure time A that is an example data of luminosity from the exposure time and gain controller 101, to determine the exposure time (S103).

The controller 100 determines whether or not the register table Rx is to be changed according to the determined exposure time A. More specifically, the controller 100 determines whether or not the determined exposure time A is equal to or greater than a prescribed threshold Ax and less than a prescribed threshold A(x+1) (S104). This determination is expressed in the equation as follows. $Ax \leq A < (x+1)$ When the determined exposure time A is not equal to or greater than the threshold Ax and less than the threshold A(x+1) ("NO" in S104), the controller 100 determines whether or not the determined exposure time A is less than the threshold Ax (S105). This determination is expressed in the equation as follows. $A < Ax$ By contrast, when the determined exposure time A is equal to or greater than the threshold Ax and less than the threshold A(x+1) ("YES" in S104), the controller 100 shifts the process to that of S110.

When the exposure time A is not less than the threshold Ax ("NO" in S105), the controller 100 sets a register table associated with a prescribed threshold, which is selected from the multiple register tables stored in the setting memory 113. More specifically, the controller 100 sets a register table R(x+1) that is greater than and adjacent to the register table Rx, which is selected from the multiple register tables and is associated with a prescribed threshold (S106).

After the register table R(x+1) is set, the controller 100 adds "1" to the numeric character x that controls the register table (S107).

When the specified exposure time A is less than the threshold Ax ("YES" in S105), the controller 100 sets a register table associated with a prescribed threshold, which is selected from the multiple register tables stored in the setting memory 113. More specifically, the controller 100 sets a register table R(x−1) that is less than and adjacent to the register table Rx, which is selected from the multiple register tables (S108).

After the register table R(x−1) is set, the controller 100 subtracts "1" from the numeric character x that controls the register table (S109).

In other words, the controller 100 selects the exposure time Ax corresponding to the set register table Rx and the register table R(x+1) corresponding to the exposure time A(x+1) that is greater than and adjacent to the register table Rx, from the multiple register tables stored in the setting memory 113.

Moreover, the controller 100 selects the exposure time Ax corresponding to the set register table Rx and the register table R(x−1) corresponding to the exposure time A(x−1) that is less than and adjacent to the register table Rx, from the multiple register tables stored in the setting memory 113.

Note that the controller 100 selects the exposure time Ax and the register table R(x+1) and the register table R(x−1) such that no exposure time exists between the exposure time Ax being referred to and the exposure time A(x+1) or the exposure time A(x−1) to be selected afterward that correspond to the register table R(x+1) and the register table R(x−1), respectively.

After the processes in S107 or S109, the controller 100 waits (WAIT) and does not start the subsequent processes until the time for a prescribed number of frames (e.g., a hundred frames) passes (S110).

Here, the controller 100 may determine the timing of updating a set value to be referred to at the time of image processing (i.e., the number of frames that determines the length of time of WAIT in S102 and S110) according to the level of luminosity determined by the photometric area controller 112, and update the register tables when this determination is made. Accordingly, even if the level of luminosity greatly changes, for example, at the entrance and exit of a tunnel or when the headlight of a vehicle travelling from the opposite direction is switched on, an image suitable for the capturing condition can be output by moving (changing) the timing of update a set value ahead.

Moreover, the controller 100 may determine the timing of updating a set value (i.e., the number of frames that determines the length of time of WAIT in S102 and S110) according to the register table associated with the determined exposure time and the register table being referred to.

<Examples of Output Image>

Next, output images captured by the imaging device 10 are described in contrast with output images that are not captured by executing the imaging method according to an example embodiment of the present invention.

Figure 5:
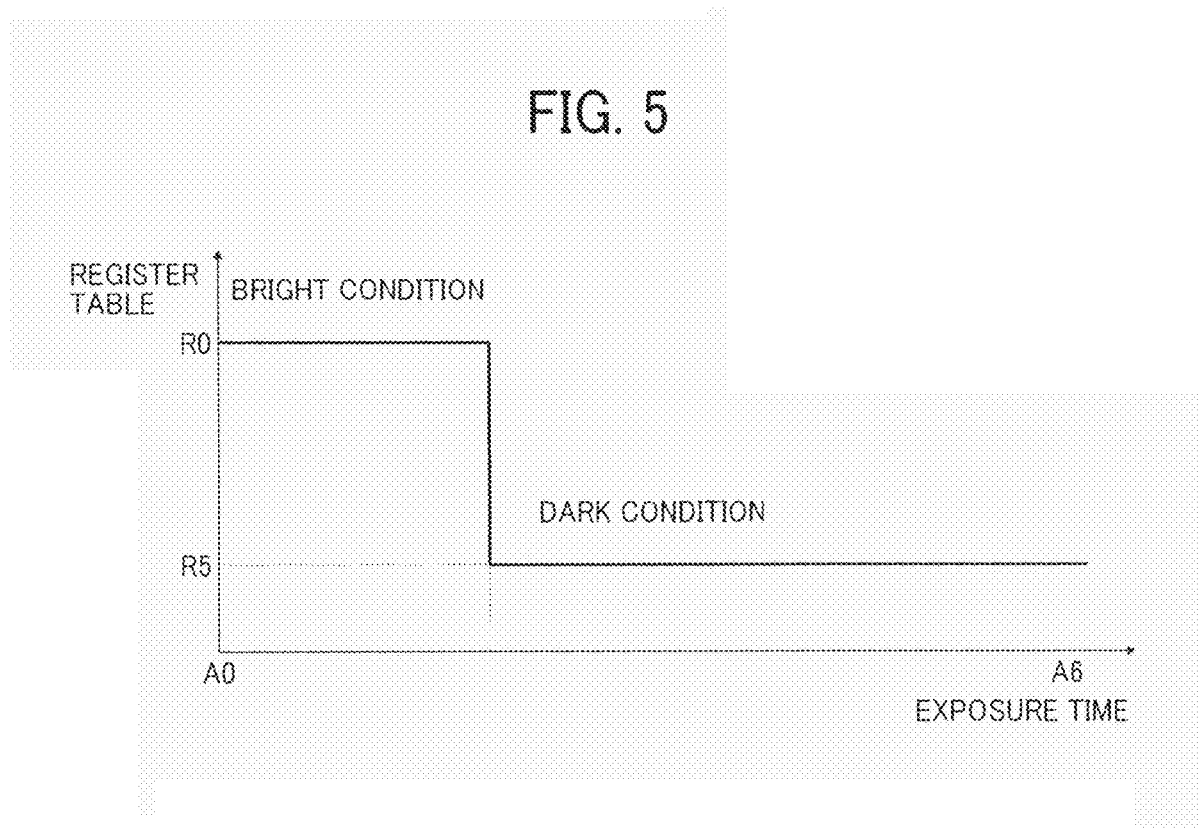
FIG. 5 is a schematic diagram of the relationship between exposure time and register tables of an imaging device as a control sample to be compared with an example embodiment of the present invention.

FIG. 5 is a schematic diagram of the relationship between exposure time and register tables of an imaging device as a control sample to be compared with an example embodiment of the present invention. The imaging device as a control sample uses the register table R0 that is optimized for bright capturing conditions and the register table R5 that is optimized for dark capturing conditions, which is different from the relationship between the exposure time and the register tables of the imaging device 10 as described above.

The imaging device as a control sample switches between the register table R0 and the register table R5 with reference to a prescribed threshold of exposure time Az.

FIGS. 6A to 6F are examples of the image output by an imaging device to be compared with an example embodiment of the present invention. In FIGS. 6A to 6F, the images 61, 62, and 63 are examples of the image processed and output by the imaging device as a control sample using the register table R5.

Figure 6A:
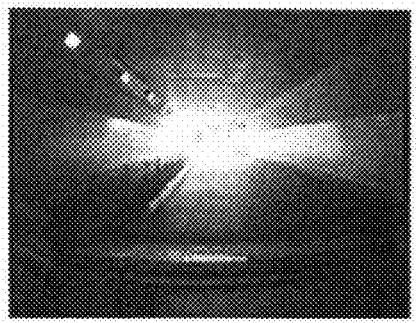
FIGS. 6A to 6F are examples of the image output by an imaging device as a control sample to be compared with an example embodiment of the present invention.
Figure 6B:
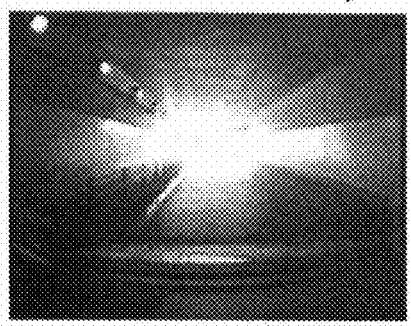
Figure 6C:
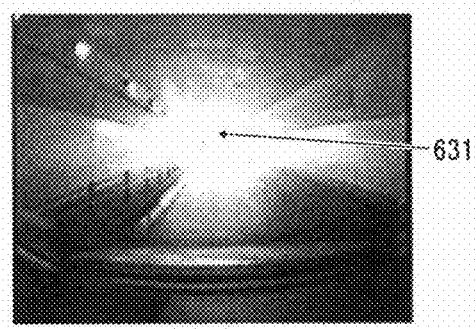
Figure 6D:
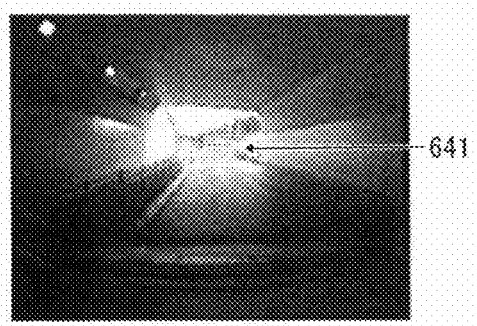
Figure 6E:
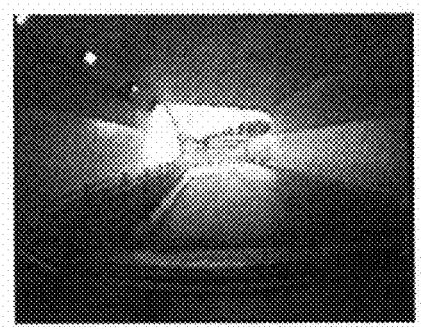
Figure 6F:
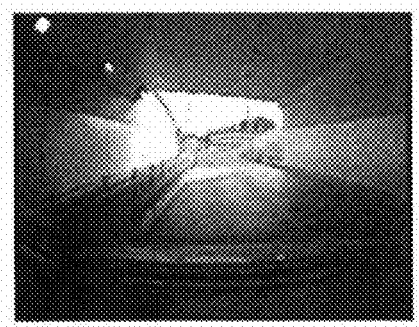
Figure 7A:
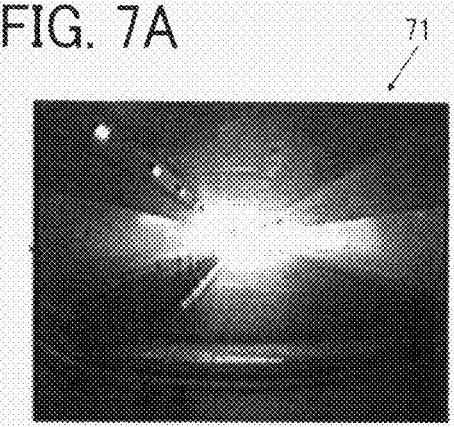
FIGS. 7A to 7F are examples of the image output by the imaging device of FIG. 1, according to an example embodiment of the present invention.
Figure 7B:
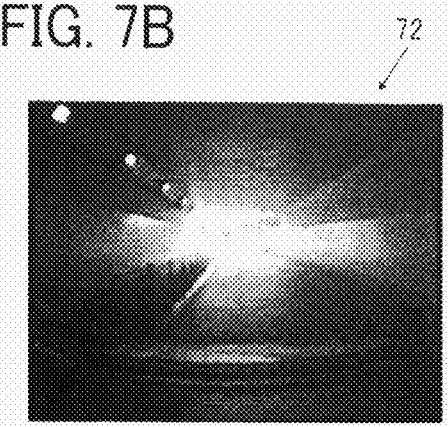
Figure 7C:
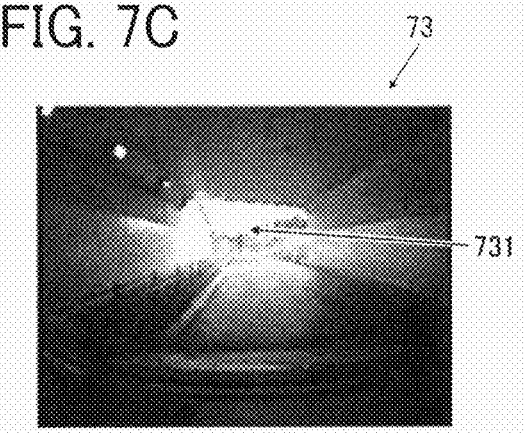
Figure 7D:
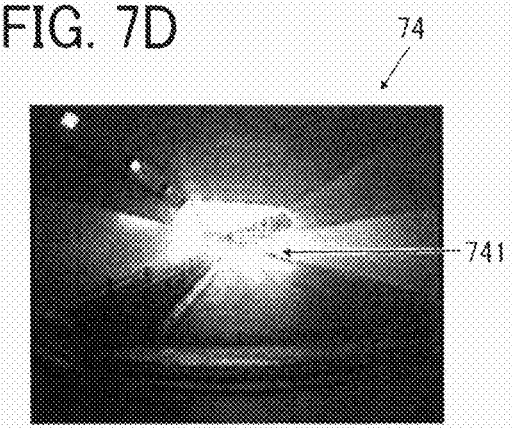
Figure 7E:
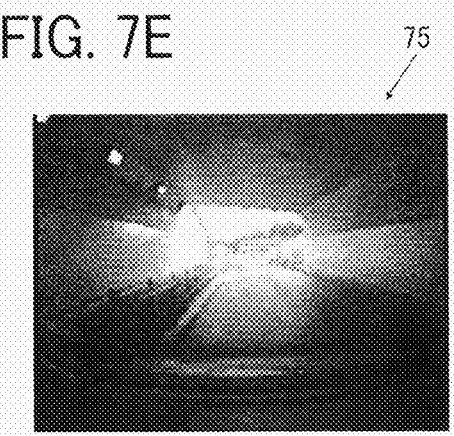
Figure 7F:
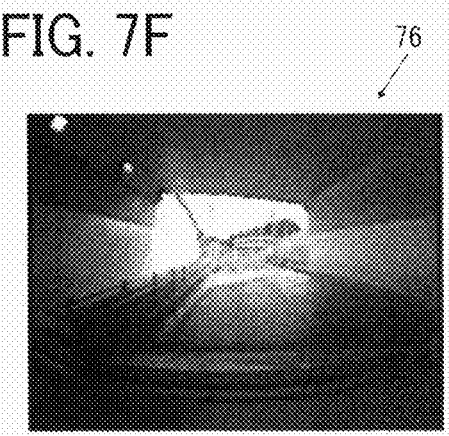

The images 64, 65, and 66 in FIGS. 6D to 6F are examples of the image processed and output by the imaging device as a control sample using the register table R0. The images 61 to 66 are images sequentially captured ahead of the vehicle by the imaging device as a control sample in the order from a middle of the tunnel to the exit of the tunnel.

The images 61 to 66 include the components of the tunnel (e.g., side wall, ceiling, sidewalk, roadway, and fence set up between the sidewalk and the roadway), the dashboard of the vehicle, and the scenery outside the tunnel.

As illustrated in FIGS. 6A to 6F, between the image 63 and the image 64, the imaging device as a control sample switches the register table Rx to be used from the register table R5 to the register table R0 with reference to a prescribed threshold of exposure time Az.

For this reason, a difference in image quality between the image 63 and the image 64 among the images output by the imaging device as a control sample is significant, and the image quality changes unnaturally when these images are viewed continuously. This results in loss of visual recognizability. In particular, the image 63 among the images output by the imaging device as a control sample has low level of visual recognizability at the portion of scenery 631 outside the tunnel, compared with the portion of scenery 641 of the image 64 outside the tunnel.

As described above, the set value of image processing greatly changes with reference to a prescribed threshold of exposure time Az when the imaging device as a control sample is used, and the image quality of the output images also greatly changes accordingly.

FIGS. 7A to 7F are examples of the image output by the imaging device 10 according to the present example embodiment. In FIGS. 7A to 7F, the images 71 to 76 are examples of the image processed and output by the imaging device 10 with sequentially shifting the register table R0 to the adjacent register tables R1, R2, R3, R4, and R5 according to the capturing condition. The images 71 to 76 are images sequentially captured ahead of the vehicle by the imaging device 10 in the order from a middle of the tunnel to the exit of the tunnel.

In a similar manner to the images 61 to 66 as described above, the images 71 to 76 include the components of the tunnel (e.g., side wall, ceiling, sidewalk, roadway, and fence set up between the sidewalk and the roadway), the dashboard of the vehicle, and the scenery outside the tunnel.

As illustrated in FIGS. 7A to 7F, the imaging device 10 processes images to be output using the register table R(x+1) or the register table R(x−1) adjacent to the register table Rx according to the capturing condition. When the image 73 and the image 74 from among the output images of the imaging device 10, where the brightness greatly changes within a very short period of time from a dark capturing condition to a bright capturing condition, are compared with each other, the portions of scenery 731 and scenery 741 outside the tunnel are appropriately captured. This is different from the images 63 and 64 described above with reference to the imaging device as a control sample.

In other words, the imaging device 10 can output images appropriately even in the cases where the brightness greatly changes within a very short period of time from a dark capturing condition to a bright capturing condition while a vehicle is travelling.

As described above, advantageous effects are achieved as below with the imaging device 10 and the imaging method according to the present example embodiment of the present invention.

According to the imaging device 10 and the imaging method, an image where an object is appropriately recognizable can be output regardless of the capturing condition.

According to the imaging device 10 and the imaging method, the register tables R1 to R4 obtained by interpolating the gap between the register table R0 and the register table R5 are used to change the set values for image processing as desired. Accordingly, images can be output appropriately.

According to the imaging device 10 and the imaging method, the register table Rx is changed to the register table R(x+1) or the register table R(x−1) when the set values are to be changed. More specifically, in the imaging device 10 and the imaging method, the register table Rx is changed to the adjacent register table R(x+1) or register table R(x−1) in sequence even when the capturing condition changes greatly within a very short period of time.

According to the imaging device 10 and the imaging method, abrupt changes in set value due to the change of the register table are prevented, and unnatural images can be prevented from being output.

According to the imaging device 10 and the imaging method, the imaging device 10 and the imaging method wait and do not change the register table until the time for a prescribed number of frames passes. Accordingly, undesired changes in set value or abrupt changes in image quality can be prevented.

Figure 8:
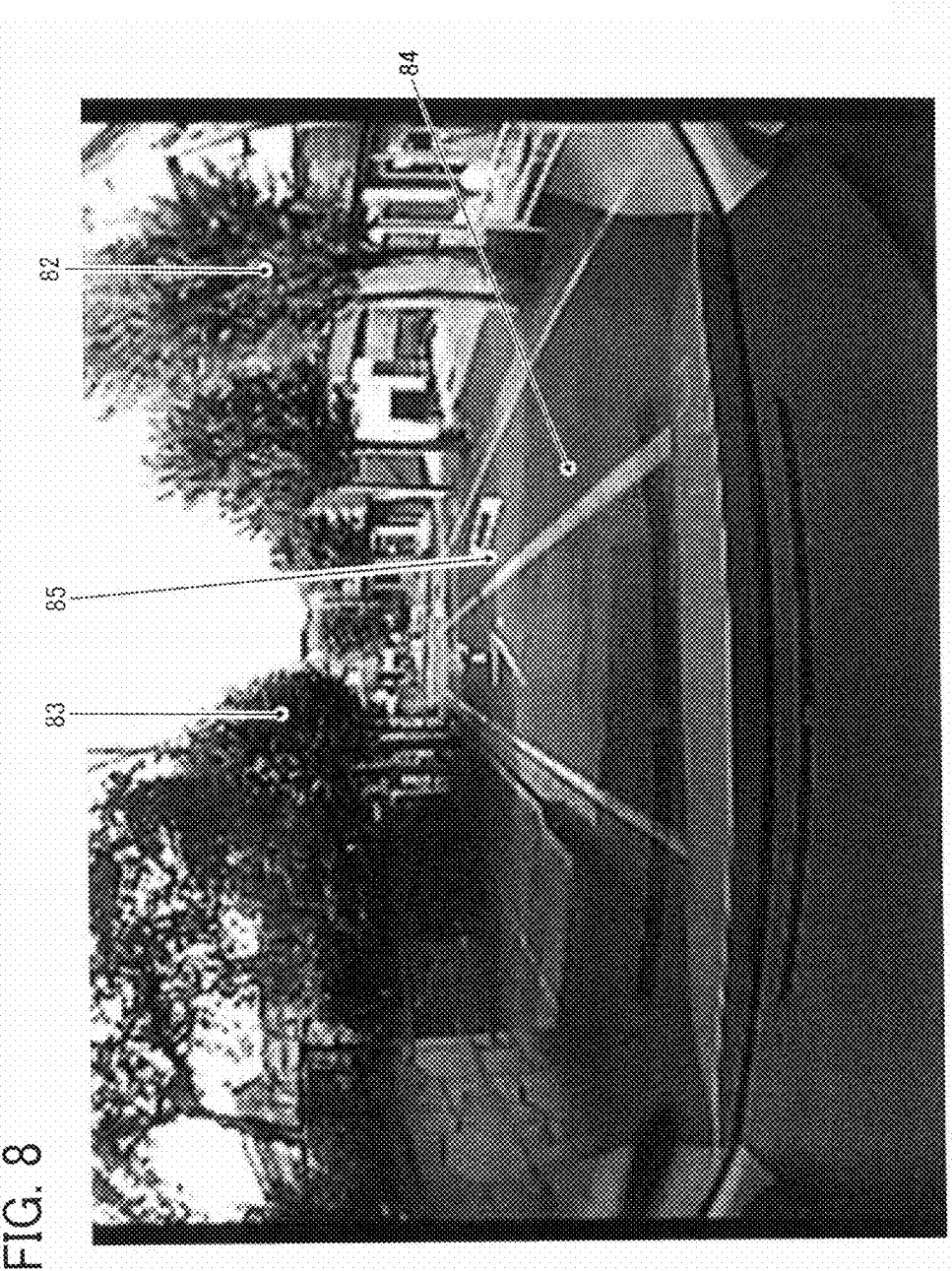
FIG. 8 is an example of the image output by the imaging device of FIG. 1 while a vehicle is travelling under sunlight filtering down through the trees, according to an example embodiment of the present invention.

FIG. 8 is an example of the image output by the imaging device 10 while a vehicle is travelling under sunlight filtering down through the trees, according to the present example embodiment. The image of FIG. 8 includes the scenery ahead of the vehicle in the direction of travel (e.g., trees 82 and 83, sky, sidewalk, roadway, fences set up between the sidewalk and the roadway, and buildings), and the dashboard of the vehicle.

As illustrated in FIG. 8, when a vehicle travels in sunlight filtering down through the trees, shade 84 and sunny place 85 alternate on the roadway under the influence of the trees 82 and 83 or the like. Accordingly, the level of luminosity of an image to be captured changes greatly within a very short period of time. Even in such cases, according to the imaging device 10 and the imaging method, the imaging device 10 and the imaging method wait and do not change the register table until the time for a prescribed number of frames passes. Accordingly, a sudden change of the register table can be prevented even when the level of luminosity changes greatly within a very short period of time.

According to the imaging device 10 and the imaging method, the imaging device 10 and the imaging method wait and do not change the register table until the time for a prescribed number of frames passes. Accordingly, the number of times the register table is switched is reduced, resulting in a reduction of power consumption.

According to the imaging device 10 and the imaging method, the number of frames for which the imaging device 10 and the imaging method wait and do not change the register table is variable. Thus, when the imaging device 10 is installed in a vehicle, the number of times the register table is changed can be changed according to the vehicle speed. Accordingly, images can be output appropriately.

<Image Processing Device>

Firstly, an image processing device according to the present example embodiment of the present invention is described.

The image processing device according to the present example embodiment performs image processing on an object image that is output from an imaging device. As an example of such image processing, the image processing device corrects the exposure to an object image or corrects the contrast. Note that the imaging device of the image processing device is the imaging device according to the example embodiment of the present invention described above.

As described above, the image processing device according to the present example embodiment includes the imaging device according to the example embodiment of the present invention, and thus an image where an object is appropriately recognizable can be output regardless of the capturing condition.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An imaging device, comprising:
an image output unit configured to output image data of an object;
a memory configured to store multiple levels of luminosity of the object in association with a plurality of parameter sets that are used when image processing is performed on the image data; and
a controller that
determines a level of luminosity of the object,
selects one of the parameter sets stored in the memory based on the determined level of luminosity, and
performs image processing on the image data, based on the selected one of the parameter sets,
wherein the controller selects the one of the parameter sets based on both a first parameter set currently being used by the image processing and the determined level of luminosity.

2. The imaging device according to claim 1, wherein the controller selects the one of the parameter sets that corresponds to one of the multiple levels of luminosity between a level of luminosity corresponding to the first parameter set currently being used by the image processing and the determined level of luminosity.

3. The imaging device according to claim 1, wherein the controller selects the one of the parameters sets such that no level of luminosity exists between a level of luminosity corresponding to the first parameter set currently being used by the image processing and the level of luminosity corresponding to the selected one of the parameter sets.

4. The imaging device according to claim 1, wherein
the controller updates the one of the parameter sets used by the image processing, and
the controller determines a timing of updating the one of the parameter sets used by the image processing based on the determined level of luminosity.

5. The imaging device according to claim 4, wherein the controller determines the timing of updating the one of the parameter sets used by the image processing based on the first parameter set currently being used by the image processing and the determined level of luminosity.

6. An imaging method, comprising:
outputting image data of an object on an image output unit;
storing multiple levels of luminosity of the object in a memory in association with a plurality of parameter sets that are used when image processing is performed on the image data;
determining a level of luminosity of the object;
selecting one of the parameter sets stored in the memory based on the determined level of luminosity; and
performing image processing on the image data, based on the selected one of the parameter sets,
wherein the selecting selects the one of the parameter sets based on both a first parameter set currently being used in the performing step and the determined level of luminosity.

7. The method according to claim 6, wherein the selecting selects the one of the parameter sets that corresponds to one of the multiple levels of luminosity between a level of luminosity corresponding to the first parameter set being used in the performing step and the determined level of luminosity.

8. The method according to claim 6, wherein the selecting selects the one of the parameter sets such that no level of luminosity exists between a level of luminosity corresponding to the first parameter set currently being used in the performing step and the level of luminosity corresponding to the selected one of the parameter sets.

9. The method according to claim 6, further comprising:
updating the one of the parameter sets used in the performing step,
wherein the updating determines a timing of updating the one of the parameter sets used in the performing step based on the determined level of luminosity.

10. The method according to claim 9, wherein the updating determines the timing of updating the one of the parameter sets used in the performing step based on the first parameter set currently being used in the performing step and the determined level of luminosity.

11. A computer-readable non-transitory recording medium storing a program for causing a computer to execute an imaging method, the method comprising:
outputting image data of an object on an image output unit;
storing multiple levels of luminosity of the object in a memory in association with a plurality of parameter sets that are used when image processing is performed on the image data;
determining a level of luminosity of the object;

selecting one of the parameter sets stored in the memory based on the determined level of luminosity; and performing image processing on the image data, based on the selected one of the parameter sets, wherein the selecting selects the one of the parameter sets based on both a first parameter set currently being used in the performing step and the determined level of luminosity.

12. The computer-readable medium according to claim 11, wherein the selecting selects the one of the parameter sets that corresponds to one of the multiple levels of luminosity between a level of luminosity corresponding to the first parameter set being used in the performing step and the determined level of luminosity.

13. The computer-readable medium according to claim 11, wherein the selecting selects the one of the parameter sets such that no level of luminosity exists between a level of luminosity corresponding to the first parameter set currently being used in the performing step and the level of luminosity corresponding to the selected one of the parameter sets.

14. The computer-readable medium according to claim 11, further comprising:

updating the one of the parameter sets used in the performing step, wherein the updating determines a tuning of updating the one of the parameter sets used in the performing step based on the determined level of luminosity.

15. The computer-readable medium according to claim 14, wherein the updating determines the timing of updating the one of the parameter sets used in the performing step based on the first parameter set currently being used in the performing step and the determined level of luminosity.

16. An image processing device, comprising:

the imaging device according to claim 1; and an image processing circuit configured to perform image processing on an object image output by the imaging device.

* * * * *